UNITED STATES PATENT OFFICE.

KARL J. OECHSLIN, OF PARIS, FRANCE.

ALIPHATIC ACIDS CONTAINING AN ARSENOARYLAMIN GROUP.

1,299,214.  Specification of Letters Patent.  Patented Apr. 1, 1919.

No Drawing.  Application filed March 4, 1915.  Serial No. 12,086.

*To all whom it may concern:*

Be it known that I, KARL JACOB OECHSLIN, citizen of the Swiss Confederation, residing at Paris, in the Republic of France, have invented certain new and useful Improvements in Aliphatic Acids Containing an Arsenoarylamin Group, of which the following is an exact and complete description.

Arsenophenylglycin (*i. e.*, the p. compound) is a well-known substance which may be widely employed but its great instability is a considerable disadvantage both in its preparation and use.

I have found that by causing formaldehyde to react on this substance or on its derivatives products are obtained which exhibit great stability either as salts or as free acids.

The invention is also applicable to other similar arseno aryl derivatives of α-aminoaliphatic acids of the general formula

COOH.CH₂.NH    NH.CH₂.COOH.

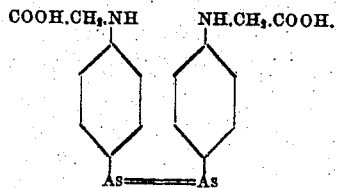

(in which the aryl or the CH₂ group of the glycin may be substituted) or to salts of these bodies. The aldehyde may also be added to a solution containing the arsenophenylglycerin and in which it has been prepared before its isolation therefrom.

Example: Arsenophenylglycerin, dissolved in a not too concentrated solution of sodium carbonate (for example, 6%), is treated with formaldehyde in amounts which may vary within wide limits; thus, to a substantially concentrated solution of the arsenophenylglycerin in sodium carbonate solution an almost equal volume of 40% formaldehyde solution may be added. From the resulting solution alcohol or acetone precipitates a sodium salt which, when dry, may be kept even in the air for a long time without losing its light yellow color, whereas arsenophenylglycerin decomposes very rapidly under the same conditions.

I declare that what I claim is:—

1. The process of preparing stable therapeutic products which includes the step of interaction between formaldehyde and a body containing the grouping

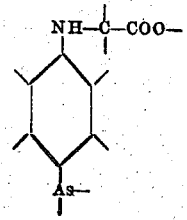

2. The process of preparing stable therapeutic products by causing formaldehyde to react with an arsenoaryl derivative of an α-aminoaliphatic acid.

3. The process of preparing a stable therapeutic product which consists in treating arsenophenylglycin with formaldehyde.

4. As new products, the light yellow stable formaldehyde derivatives of p-arsenoaryl-α-aminoaliphatic acids, such as can be obtained by the action of formaldehyde on said acids.

5. As a new product, the light yellow stable formaldehyde derivative of arsenophenylglycin, such as can be obtained by the interaction of formaldehyde on arsenophenylglycin.

In witness whereof I have hereunto signed my name this 1st day of February, 1915, in the presence of two subscribing witnesses.

K. J. OECHSLIN.

Witnesses:
  DAVID C. POOLE, Jr.,
  G. F. WADLIN.